(12) United States Patent
Li et al.

(10) Patent No.: US 12,118,690 B2
(45) Date of Patent: Oct. 15, 2024

(54) IMAGE DISPLAY METHOD AND DEVICE, AND COMPUTER STORAGE MEDIUM

(71) Applicants: Beijing BOE Optoelectronics Technology Co., Ltd., Beijing (CN); BOE Technology Group Co., Ltd., Beijing (CN)

(72) Inventors: Wenyu Li, Beijing (CN); Jinghua Miao, Beijing (CN); Hao Zhang, Beijing (CN); Lili Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/609,636

(22) PCT Filed: Dec. 25, 2020

(86) PCT No.: PCT/CN2020/139346
§ 371 (c)(1),
(2) Date: Nov. 8, 2021

(87) PCT Pub. No.: WO2022/133991
PCT Pub. Date: Jun. 30, 2022

(65) Prior Publication Data
US 2023/0316451 A1 Oct. 5, 2023

(51) Int. Cl.
G06F 3/045 (2006.01)
G06F 3/01 (2006.01)
G06F 3/14 (2006.01)
G06T 3/40 (2006.01)
G06T 5/50 (2006.01)

(52) U.S. Cl.
CPC ............... G06T 3/40 (2013.01); G06F 3/012 (2013.01); G06F 3/1407 (2013.01); G06T 5/50 (2013.01); *G06T 2207/20021* (2013.01); *G06T 2207/20221* (2013.01)

(58) Field of Classification Search
CPC ........ G06F 3/011; G06F 3/012; G06F 3/1407; G06F 3/147; G06T 2207/20021; G06T 2207/20221; G06T 3/40; G06T 3/4092; G06T 5/50; G09G 2340/0435; G09G 2340/045; G09G 2354/00; G09G 2370/04; G09G 2370/042; G09G 5/006; G09G 5/391; H04N 7/01
See application file for complete search history.

(56) References Cited

U.S. PATENT DOCUMENTS

2014/0015867 A1\* 1/2014 Xin .................. H04N 13/39
359/462
2018/0336867 A1\* 11/2018 Gu .................. G09G 5/391

\* cited by examiner

*Primary Examiner* — Insa Sadio
(74) *Attorney, Agent, or Firm* — IPro, PLLC

(57) ABSTRACT

Provided is an image display method, including: transmitting a first image of a first resolution to a display component at a first frequency in the case that the mode information indicates a first mode, wherein the first image is formed by splicing a plurality of sub-images of a second resolution; and transmitting a second image of the first resolution to the display component at a third frequency in the case that the mode information indicates a second mode, wherein n second images form a frame of image of the display component.

19 Claims, 6 Drawing Sheets

IMAGE DISPLAY METHOD AND DEVICE, AND COMPUTER STORAGE MEDIUM

This application is a US national stage of international application No. PCT/CN2020/139346, filed on Dec. 25, 2020, the disclosure of which is herein incorporated by reference in its entirety.

TECHNICAL FIELD

The present disclosure relates to the field of display technologies, and in particular relates to an image display method, apparatus and device, and a computer storage medium.

BACKGROUND

A display device is a device for displaying images and includes a processing component and a display component.

According to an image display method, the processing component in the display device processes an image of a predetermined resolution and transmits the image of the resolution to the display component, and the display component displays the image. The stronger the performance (which may include capabilities to process and transmit images) of the processing component, the higher the frequency at which the processing component transmits images to the display component, and the higher the frame rate at which the display component displays images (the frame rate may be a frequency at which the display component displays a plurality of images). The weaker the performance of the processing component, the lower the frequency at which the processing component transmits images to the display component, and the lower the frame rate at which the display component displays images.

However, in the above image display method, the frame rate at which the display component displays images is merely decided by the performance of the processing component, and thus the flexibility is low.

SUMMARY

Embodiments of the present disclosure provide an image display, apparatus and device, and a computer storage medium.

In a first aspect of the present disclosure, an image display method is provided. The method is applicable to a processing component and includes:
acquiring mode information;
transmitting a first image of a first resolution to a display component at a first frequency in the case that the mode information indicates a first mode, wherein the first image is formed by splicing a plurality of sub-images of a second resolution; and
transmitting a second image of the first resolution to the display component at a third frequency in the case that the mode information indicates a second mode, wherein n second images form a frame of image of the display component, and n≥2.

Optionally, transmitting the first image of the first resolution to the display component at the first frequency in the case that the mode information indicates the first mode includes:
acquiring the plurality of sub-images of the second resolution in the case that the mode information indicates the first mode; and
splicing the plurality of sub-images into the first image of the first resolution.

Optionally, transmitting the second image of the first resolution to the display component at the third frequency in the case that the mode information indicates the second mode includes:
acquiring a third image of a third resolution in the case that the mode information indicates the second mode;
cropping the third image into the n second images of the first resolution; and
transmitting the second image of the first resolution to the display component at the third frequency.

Optionally, transmitting the first image of the first resolution to the display component at the first frequency includes:
generating the first image of the first resolution with a first mode identifier; and
transmitting the first image of the first resolution with the first mode identifier to the display component.

Optionally, transmitting the second image of the first resolution to the display component at the third frequency includes:
generating the second image of the first resolution with a second mode identifier; and
transmitting the second image of the first resolution with the second mode identifier to the display component.

Optionally, the method is applicable to the processing component in a virtual reality device, and acquisition the mode information includes:
acquiring posture information of a user's head;
determining a rotation speed of the head based on the posture information;
determining that the mode information indicates the first mode in response to the rotation speed being greater than a threshold; and
determining that the mode information indicates the second mode in response to the rotation speed being less than or equal to the threshold.

In a second aspect, an image display method is provided. The method is applicable to a display component and includes:
receiving an image of a first resolution;
acquiring a mode identifier, wherein the mode identifier is configured to indicate that the image is in a first mode or a second mode;
in the case that the image is in the first mode, splitting the image as a first image into a plurality of sub-images of a second resolution, and displaying the plurality of sub-images of the second resolution at a second frequency;
in the cast that the image is in the second mode, receiving n−1 images of the first resolution, and n≥2; and
splicing the received n images of the first resolution into a frame of image for display.

Optionally, acquiring the mode identifier includes:
acquiring the mode identifier in the image.

Optionally, in the case that the image is in the first mode, splitting the image as the first image into the plurality of sub-images of the second resolution, and displaying the plurality of sub-images of the second resolution at the second frequency includes:
cropping the image of the first resolution into the plurality of sub-images of the second resolution in the case that the image is in the first mode; and
scaling up the sub-images of the second resolution into an image of a third resolution and displaying the image of the third resolution at the second frequency.

Optionally, the image of the first resolution is regarded as an second image, and splicing the received n images of the first resolution into the frame of the image for display includes:

displaying a third image of a third resolution at a fourth frequency, wherein the third image is composed of the n second images, the fourth frequency being lower than the second frequency, and the third resolution being greater than the first resolution.

In a third aspect, a display device is provided. The display device includes a processing component and a display component, wherein the processing component is configured to acquire mode information;

the processing component is configured to, in the case that the mode information indicates a first mode, transmit a first image of a first resolution to the display component at a first frequency, wherein the first image is formed by splicing a plurality of sub-images of a second resolution;

the display component is configured to display the plurality of sub-images in the first image at a second frequency, wherein the second frequency is greater than the first frequency;

the processing component is configured to, in the case that the mode information indicates a second mode, transmit a second image of the first resolution to the display component at a third frequency; and the display component is configured to, upon receiving n second images, splice the n second images into a frame of image for display, where n≥2.

In a fourth aspect, an image display device is provided. The image display device includes a processor and a memory storing at least one instruction, at least a program, a code set, or an instruction set therein, wherein the processor, when loading and executing the at least one instruction, the at least one program, the code set or the instruction set, is caused to perform the image display method as described above.

In a fifth aspect, a computer storage medium is provided. The computer storage medium stores at least one instruction, at least one program, a code set, or an instruction set, wherein the at least one instruction, the at least one program, the code set or the instruction set, when loaded and executed by a processor, causes the processor to perform the image display method as described above.

In an sixth aspect of the present disclosure, a computer program product or computer program is provided. The computer program product or computer program includes computer instructions, and the computer instructions are stored in a computer-readable storage medium. A processor of a computer device reads the computer instructions from the computer-readable storage medium, and executes the computer instruction, such that the computer device performs the methods according to various optional implementations described above.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may derive other drawings from these accompanying drawings without creative efforts.

The above drawings have shown the specific embodiments of the present disclosure, and the embodiments will be described in more detail later. These drawings and text descriptions are not intended to limit the scope of the concept of the present disclosure in any way, but to explain the concept of the present disclosure for those skilled in the art by referring to specific embodiments.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
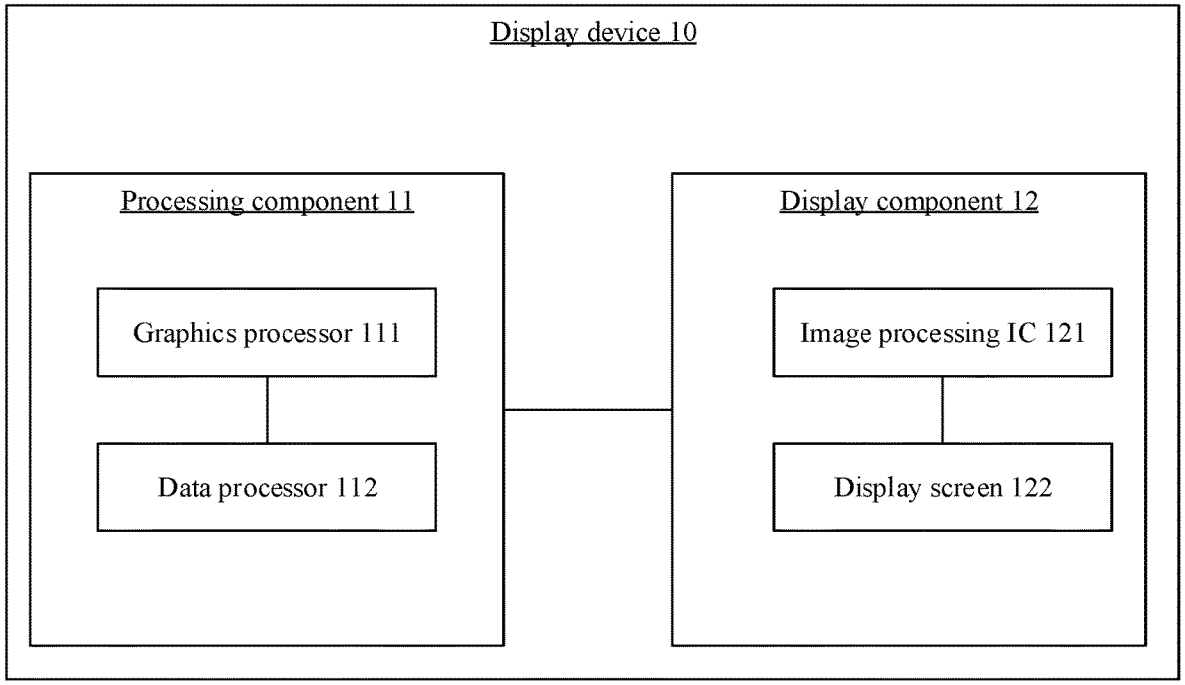
FIG. 1 is a schematic diagram of a display device according to an embodiment of the present disclosure.

A display device is a device with image processing and image display functions. FIG. 1 is a schematic diagram of a display device according to an embodiment of the present disclosure. The display device 10 includes a processing component 11 and a display component 12.

The processing component 11 may include a graphics processor (such as graphics processing unit (GPU)) 111 and a data processor (such as a central processing unit (CPU)) 112. The data processor 112 receives external data (such as image information) and controls the graphics processor 111. The graphics processor 111 performs processing such as rendering on an image, and transmits the image to the display component 12.

The processing component 11 may be an image processing host.

The display component 12 may include an image processing integrated circuit (IC) 121 and a display screen 122. The image processing integrated circuit 121 may receive the image transmitted by the graphics processor 111, and transmit the image as processed to the display screen 122 for display.

Currently, due to software and other reasons, the resolution of the image output by the graphics processor 111 is difficult to change. In addition, the processing component 11 has limited image processing capabilities. Therefore, the resolution of the image output by the graphics processor 111 to the display component 12 is negatively correlated with the number of images that can be output per unit time, that is, the greater the resolution of the output image, the less the number of images output per unit time (accordingly, the lower the frequency of the processing component transmitting the image to the display component). In contrast, the lower the resolution of the output image, the more the number of images output per unit time (accordingly, the higher the frequency of the processing component transmitting the image to the display component).

It can be seen from the above that the higher the resolution of the image displayed by the display component, the lower the frequency of displaying the image (this frequency may be called frame rate), and the lower the resolution of the image displayed by the display component, the higher the frequency of displaying the image. Moreover, since the resolution of the image output by the graphics processor 111 is difficult to change after leaving the factory, this may cause the resolution and frame rate of the image displayed by the display component 12 to be difficult to adapt to various situations, and thus the flexibility is low.

In an exemplary embodiment, when a picture is a scene that changes quickly (such as a moving scene), if a frame rate of the picture displayed on the display screen is low, such as lower than 30 frames, the human eye may feel obvious non-smoothness. When the picture is a relatively static scene, if the resolution of the picture displayed on the display screen is low, the human eye may feel the picture is blurry. Therefore, when the display device leaves the factory, whether the output resolution of the processing component is a high resolution to achieve a fine picture of a static scene, or the output resolution of the processing component is a low resolution to achieve a smooth picture of a dynamic scene, it is difficult to satisfy the requirements of different situations.

An embodiment of the present disclosure provides an image display method. According to the methods, images are split or spliced to achieve two display modes of "high frame rate, low resolution" and "high resolution, low frame rate" to satisfy the needs of different scenes, greatly improving the display effect and user experience of the display device.

Figure 2:
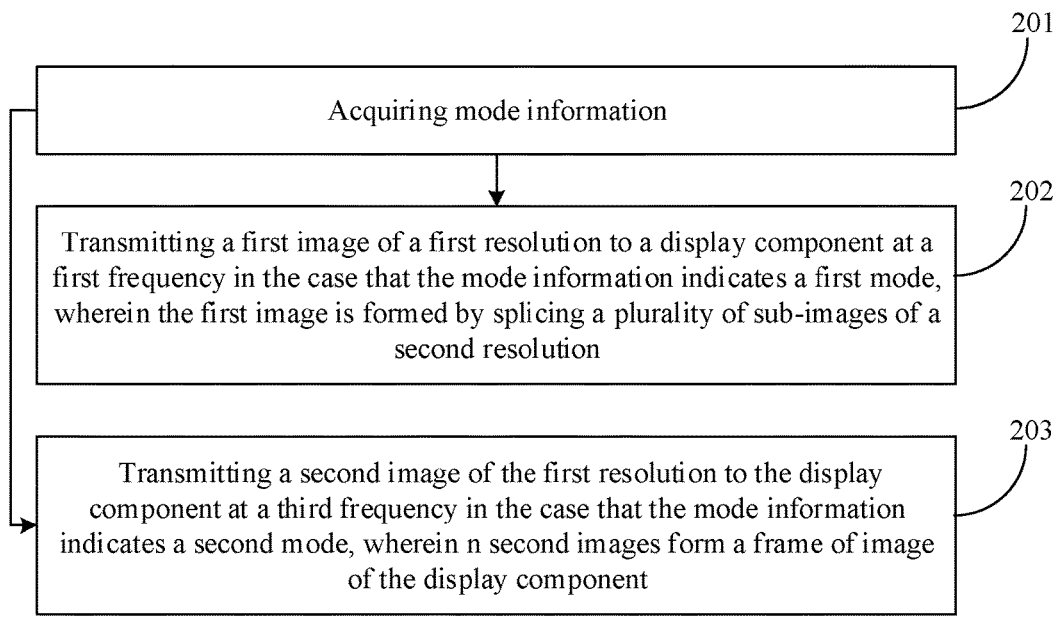
FIG. 2 is a flowchart of an image display method according to an embodiment of the present disclosure.

FIG. 2 is a flowchart of an image display method according to an embodiment of the present disclosure. In this embodiment, the fact that the image display method is applied to the processing component of the display device shown in FIG. 1 is taken as an example. The image display method may include the following steps.

In step 201, mode information is acquired.

In step 202, in the cast that the mode information indicates a first mode, a first image of a first resolution is transmitted to the display component at a first frequency, wherein the first image is formed by splicing a plurality of sub-images of a second resolution.

In step 203, in the cast that the mode information indicates a second mode, a second image of the first resolution is transmitted to the display component at a third frequency, wherein n second images form a frame of image of the display component, and n is greater than or equal to 2.

In summary, according to the image display method provided by the embodiment of the present disclosure, two types of display modes are provided. In one mode, a first image composed of a plurality of sub-images can be transmitted to a display component, such that the display component displays these sub-images at a higher frequency. In another mode, a frame of an image can be transmitted to the display component a plurality of times, such that the display component displays images of a higher resolution at a lower frequency. The display methods are more abundant, and the flexibility is high, which solves the problem of low flexibility in the methods in the related technology, and achieves the effect of improving the flexibility of the method.

Figure 3:
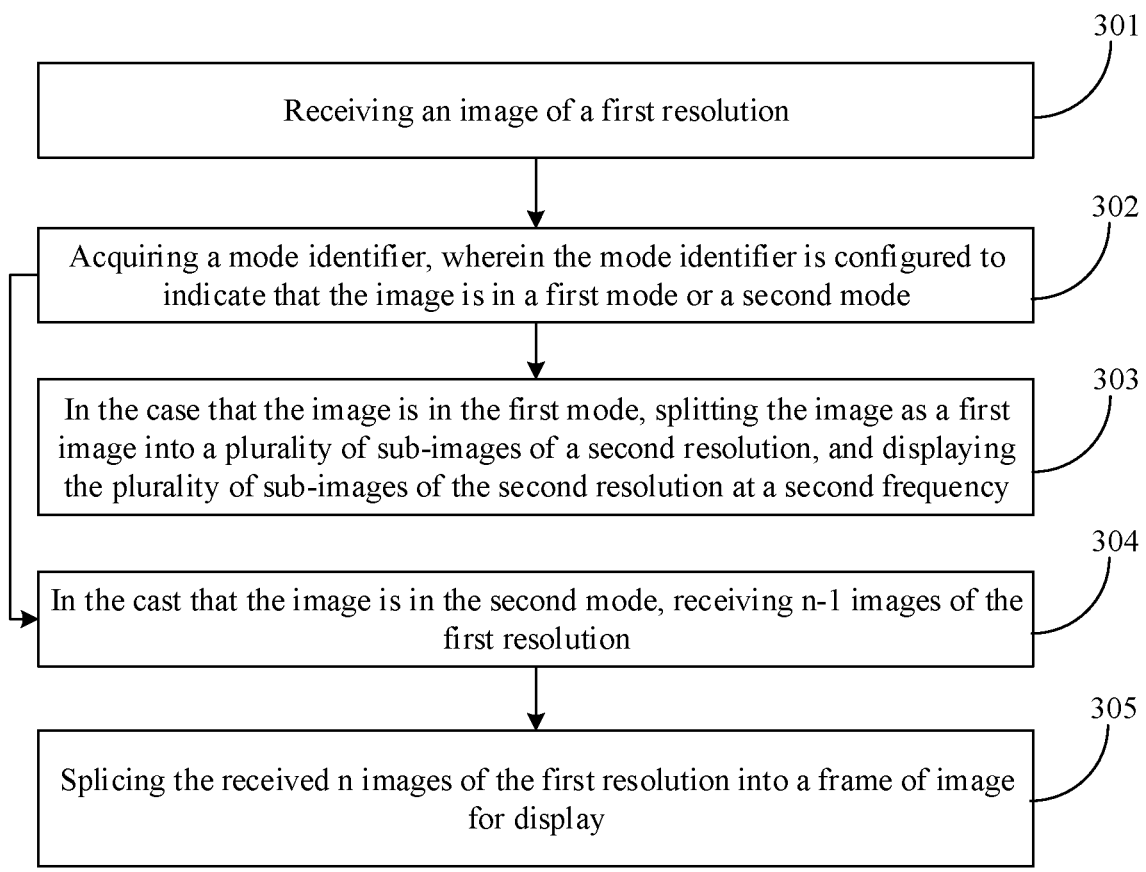
FIG. 3 is a flowchart of an image display method according to another embodiment of the present disclosure.

FIG. 3 is a flowchart of an image display method according to another embodiment of the present disclosure. In this embodiment, the fact that the image display method is applied to the display component of the display device shown in FIG. 1 is taken as an example. The image display method may include the following steps.

In step 301, an image of a first resolution is received.

In step 302, a mode identifier is acquired, wherein the mode identifier is configured to indicate that the image is in a first mode or a second mode.

In step 303, in the case that the image is in the first mode, the image is used as the first image and split into a plurality of sub-images of a second resolution, and the plurality of sub-images of the second resolution is displayed at a second frequency.

In step 304, in the case that the image is in the second mode, n−1 images of the first resolution are received.

In step 305, the n images of the first resolution as received are spliced into a frame of image for display, and n is greater than or equal to 2.

In summary, according to the image display method provided by the embodiment of the present disclosure, two types of display modes are provided. In one mode, a first image composed of a plurality of sub-images can be transmitted to a display component, such that the display component displays these sub-images at a higher frequency. In another mode, a frame of an image can be transmitted to the display component a plurality of times, such that the display component displays images of a higher resolution at a lower frequency. The display methods are more abundant, and the flexibility is high, which solves the problem of low flexibility in the methods in the related technology, and achieves the effect of improving the flexibility of the method.

Figure 4:
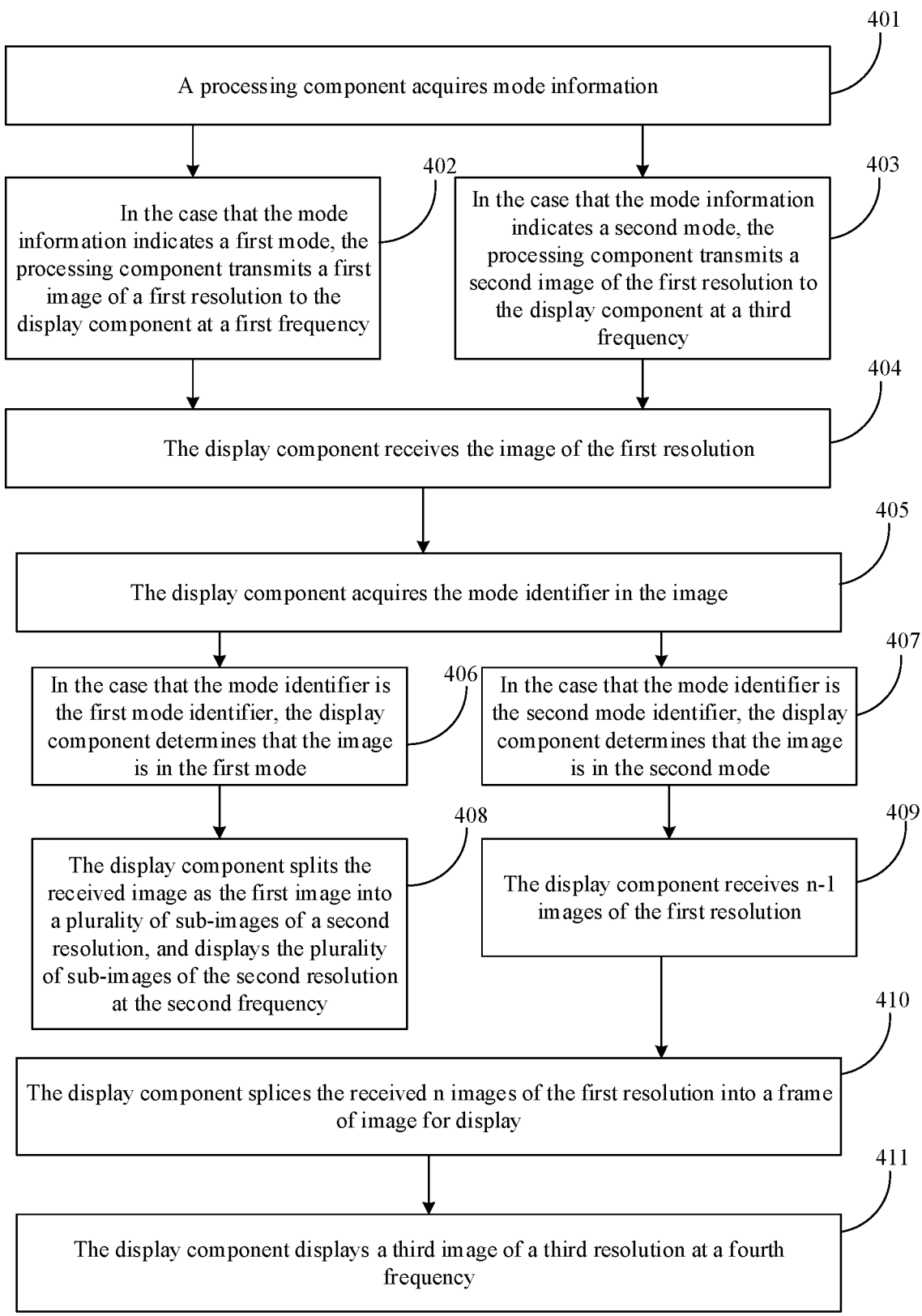
FIG. 4 is a flowchart of an image display method according to yet another embodiment of the present disclosure.

FIG. 4 is a flowchart of an image display method according to another embodiment of the present disclosure. In this embodiment, the fact that the image display method is applied to the display device shown in FIG. 1 is taken as an example. The image display method may include the following steps.

In step 401, a processing component acquires mode information.

The method according to the embodiment of the present disclosure may be applicable to a virtual reality (VR) device, that is, the display device shown in FIG. 1 may be a part or all of a virtual reality device.

The virtual reality device may include a processing component and a wearable display. The wearable display may include a head-mounted display or a glasses display. The wearable display may be the display component 12 in the implementation environment shown in FIG. 1.

The wearable display may include sensors such as speed sensors, acceleration sensors, and angular velocity sensors, which are used to collect posture information of a user's head and adjust the picture accordingly.

Optionally, step 401 may include the following sub-steps.

1) Posture information of a user's head is acquired.

The posture information of the user's head can be collected by sensors in the display component and transmitted to the processing component.

The posture information may include various information such as movement information of the user's head.

2) A rotation speed of the head is determined based on the posture information.

The processing component may determine the rotation speed of the user's head based on the posture information, and the rotation speed may include an angular velocity of rotation along a certain axis (such as an x-axis perpendicular to the ground).

3) When the rotation speed is greater than a threshold, it is determined that the mode information indicates the first mode.

When the rotation speed of the user's head is greater than the threshold, it indicates that the user's head is rotating rapidly. Correspondingly, the picture displayed by the display component is also in a dynamic scene with fast changes. In this case, it can be determined that the mode information is configured to indicate the first mode, and the first mode may be a "high frame rate mode".

The threshold may be determined based on the image processing capability of the processing component and the physical resolution of the display component (the physical resolution is an inherent parameter of the display screen of the display component, which may refer to the maximum number of pixels that may be displayed on the display screen). For example, the stronger the image processing capability of the processing component, the greater the threshold, and the greater the physical resolution of the display component, the lower the threshold.

4) When the rotation speed is less than or equal to the threshold, it is determined that the mode information indicates the second mode.

When the rotation speed of the user's head is lower than or equal to the threshold, it indicates that the user's head is not rotating fast. Correspondingly, the picture displayed by the display component is also in a slower and gentler static scene. It can be determined that the mode information is intended for indicating the second mode, and the second mode may be a "high resolution mode".

In step 402, in the case that the mode information indicates the first mode, the processing component transmits a first image of a first resolution to the display component at a first frequency. Step 404 is performed.

The first image is formed by splicing a plurality of sub-images of a second resolution. The first resolution may be a preset resolution of an image output by the processing component. The first frequency may be a frequency determined based on the image processing capability of the processing component. The stronger the image processing capability of the processing component, the higher the first frequency, and the weaker the image processing capability of the processing component, the lower the first frequency. The first resolution is lower than the physical resolution of the display screen of the display component, such that in the subsequent second mode, a plurality of second images of the first resolution may form a frame of image for display.

Optionally, step 402 may include the following.

1) In the case that the mode information indicates the first mode, the processing component acquires a plurality of sub-images of a second resolution.

When in the first mode, the processing component may generate and render the plurality of sub-images of the second resolution.

The data processor in the processing component may receive or generate image information, and transmit the image information to the graphics processor. The image information is configured to indicate information of an image to be displayed. The graphics processor may process the image to be displayed in different ways based on different modes. For example, in the first mode, the processing component may generate the plurality of sub-images of the second resolution.

2) The processing component splices the plurality of sub-images into the first image of the first resolution.

The second resolution is lower than the first resolution, and the processing component may splice the plurality of sub-images of the second resolution into the first image of the first resolution.

In an exemplary embodiment, if the second resolution is 540×540 and the number of sub-images is 4, then the first resolution may be 540×2160, that is, 4 sub-images are spliced in a column direction. Of course, the first resolution may also be 1080×1080, which is not limited in the embodiment of the present disclosure.

In this way, the processing component may continuously generate the first image and transmit the first image to the display component at the first frequency.

Optionally, step 402 may also include the following two sub-steps.

1) The processing component generates the first image of the first resolution with a first mode identifier.

The processing component may set the first mode identifier in the first image.

When the first image is rectangular, one or more pixels in four corners of the image will not be displayed by the display component. Therefore, the processing component may set the first image identifier by the pixels in the corners of the first image.

Optionally, the processing component represents the first mode identifier by using a color of a pixel located at a corner or a graphic formed by a plurality of pixels. In an exemplary embodiment, the processing component may set a first pixel in an upper left corner of the first image as a white pixel, and use the white pixel as the first mode identifier. Alternatively, a plurality of pixels in the upper left corner of the first image may form a graphic 1 to be used as the first mode identifier.

2) The processing component transmits the first image of the first resolution with the first mode identifier to the display component.

In step 403, in the case that the mode information indicates the second mode, the processing component transmits a second image of the first resolution to the display component at a third frequency. Step 404 is performed.

The second image may be a part of a frame of an image displayed on the display screen of the display component, and a plurality of second images may form a frame of an image displayed on the display screen. That is, the first resolution may be one-nth of the physical resolution of the display screen, and n second images of the first resolution may form the frame of the image displayed on the display screen.

The third resolution may be a preset resolution of an image output by the processing component. The third frequency may be a frequency determined based on the image processing capability of the processing component. The stronger the image processing capability of the processing component, the higher the third frequency, and the weaker the image processing capability of the processing component, the lower the third frequency.

Optionally, the first frequency is equal to the third frequency, such that the frequency may be set as the maximum frequency that the image processing capability of the processing component can bear, so as to make full use of the image processing capability of the processing component.

Optionally, step 403 may include the following three sub-steps.

1) In the case that the mode information indicates the second mode, the processing component acquires a third image of a third resolution.

In the second mode, the processing component may generate and render the third image of the third resolution based on the received image information or locally generated image information.

2) The processing component crops the third image into n second images of the first resolution.

The processing component may crop the third image with a greater resolution into the n second images of the first resolution.

3) The processing component transmits the second image of the first resolution to the display component at the third frequency.

After acquiring the n second images of the first resolution, the processing component may transmit the n second images to the display component at the third frequency.

Optionally, step 403 may also include the following two sub-steps.

1) The second image of the first resolution with a second mode identifier is generated.

The processing component may set the second mode identifier in the second image.

When the first image is rectangular, one or more pixels in four corners of the image will not be displayed by the display component, so the processing component may represent the second mode identifier by the pixels in the four corners of the first image.

Optionally, the processing component represents the second mode identifier by using colors of pixels at four corners or a graphic formed by a plurality of pixels. In an exemplary embodiment, the processing component may set a first pixel in an upper left corner of the first image as a black pixel, and use the black pixel as the second mode identifier. Alternatively, a plurality of pixels in the upper left corner of the first image may form a graphic 2 to be used as the second mode identifier.

2) The second image of the first resolution with the second mode identifier is transmitted to the display component.

In step 404, the display component receives the image of the first resolution.

In the two types of modes, what is received by the display component is the image of the first resolution.

In step 405, the display component acquires the mode identifier in the image.

Upon receiving the image of the first resolution, the image processing IC in the display component may acquire the mode identifier in the image and determine whether the mode identifier is the first mode identifier or the second mode identifier.

In step 406, in the case that the mode identifier is the first mode identifier, the display component determines that the image is in the first mode. Step 408 is performed.

The image processing IC in the display component may determine that the image is in the first mode when the mode identifier of the received image is the first mode identifier.

In step 407, in the case that the mode identifier is the second mode identifier, the display component determines that the image is in the second mode. Step 409 is performed.

The image processing IC in the display component may determine that the image is in the second mode when the mode identifier of the received image is the second mode identifier.

In step 408, the display component splits the received image as the first image into a plurality of sub-images of the second resolution, and displays the plurality of sub-images of the second resolution at the second frequency.

In the first mode, the image processing IC in the display component may take the received image as the first image, and split the first image into a plurality of sub-images of the second resolution, and display the plurality of sub-images of the second resolution at the second frequency. The image processing IC may perform splitting in a manner corresponding to the arrangement of the sub-images when the processing component generates the first image in step 402. In an exemplary embodiment, if the first resolution is 540×2160, the number of sub-images is 4, and the second resolution is 540×540, the image processing IC may split the first image into 4 sub-images of a resolution of 540×540, and input these sub-images to the display screen for display at the second frequency.

Since each first image received by the display component may be split into a plurality of sub-images for display in a plurality of frames, the second frequency is greater than the first frequency of the image output by the display component, such that the second frequency is higher, and the frame rate of the image displayed on the display screen is higher. For example, it may be greater than or equal to 60 frames, such as 90 frames, 120 frames, 144 frames, or 240 frames.

It should be noted that since the physical resolution of the display screen is greater than the sub-image of the second resolution, the image processing IC in the display component may scale up the resolution of the sub-image to be consistent with the physical resolution of the display screen to achieve a better display effect before transmitting the sub-image of the second resolution to the display screen for display.

Figure 5:
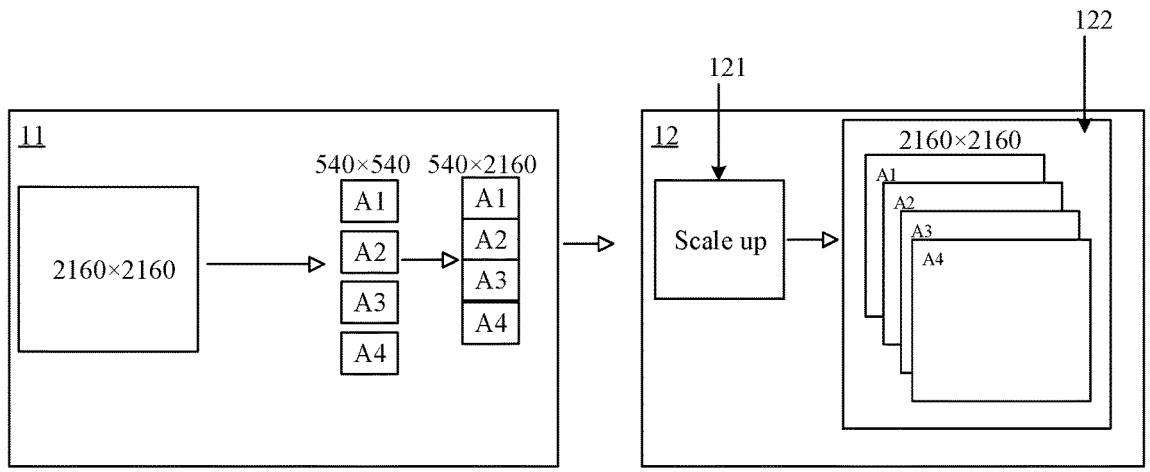
FIG. 5 is a schematic flowchart of a first mode in the embodiment shown in FIG. 4.

Steps 402, 404, 405, and 408 show the display manner of the first mode. In an exemplary embodiment, FIG. 5 is a schematic diagram of the display in the first mode according to an embodiment of the present disclosure. The physical resolution of the display screen 122 is 2160×2160. The processing component 11 renders and processes the image to be displayed of a resolution of 2160×2160 at a resolution of 540×540 (it should be noted that in the processing component, it is possible that the image to be displayed of a resolution of 2160×2160 may not actually exist, but an image of a resolution of 540×540 may be directly acquired), acquires 4 images of a resolution of 540×540 (A1, A2, A3, and A4), then combines these 4 images of a resolution of 540×540 into a first image of a resolution of 540×2160, and transmits the first image to the display component 12. The image processing IC in the display component 12 scales up each sub-image in the first image to a resolution of 2160×2160 to be displayed on the display screen 122 at a higher second frequency, such that a high frame rate display mode is realized.

The reduced visual sensitivity of the human eye accompanied by rapid saccades is called saccade suppression. Due to the saccade suppression phenomenon, the human eye is less sensitive to the resolution of the image in a dynamic scene, but sensitive to the frame rate of the image display, so in this case, the image may be displayed at a lower resolution and a higher frame rate to improve user experience.

In step 409, the display component receives n−1 images of the first resolution.

Where n≥2. In the second mode, since each second image of the first resolution is a part (one-nth) of a frame of an image displayed on the display screen, the image processing IC in the display component may continue to receive n−1 images of the first resolution, and n≥2.

In step 410, the display component splices the received n images of the first resolution into a frame of image for display.

After the image processing IC in the display component receives n second images of the first resolution, the reception of a frame of image is completed. In this case, the n second images may be transmitted to the display screen for display in one frame. During the transmission, the image processing IC may transmit the n second images to the display screen one by one for display, or transmit the image formed by splicing the n second images to the display screen for display as a whole.

In step 411, the display component displays a third image of a third resolution at a fourth frequency.

That is, in the second mode, the display component may subsequently continue to display the third image of the third resolution at the fourth frequency.

The third image is composed of n second images. Since the display component displays a frame of an image upon receiving n second images transmitted by the processing component at the first frequency, the fourth frequency is lower than the first frequency, and the fourth frequency is also lower than the second frequency.

Correspondingly, since each third image is composed of n second images of the first resolution, the third resolution is also greater than the first resolution. Optionally, the third resolution is a sum of n first resolutions. In an exemplary embodiment, the first resolution is 540×2160 and n is 4, then the third resolution is 2160×2160, and the third resolution may be equal to the physical resolution of the display screen.

Figure 6:
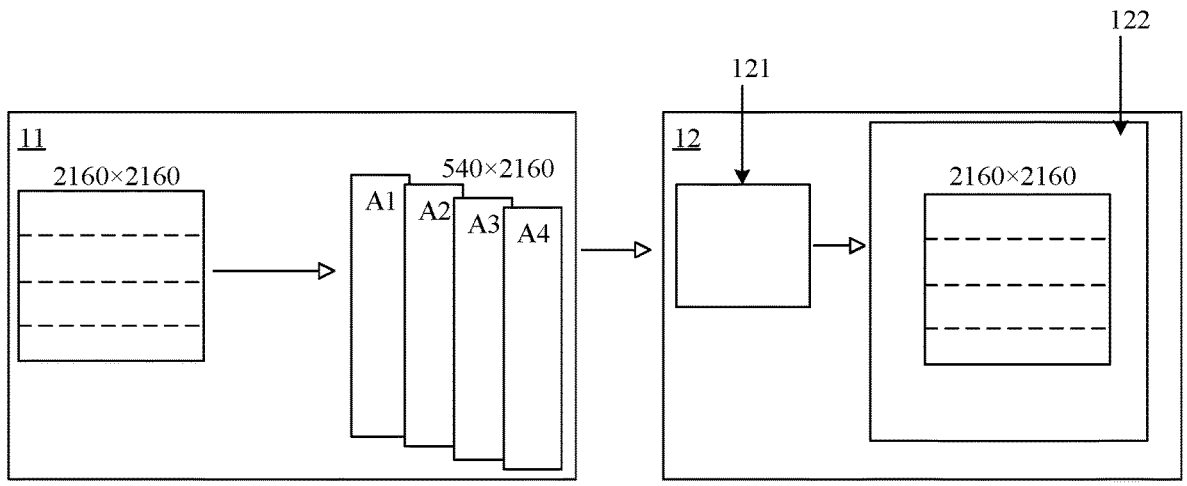
FIG. 6 is a schematic flowchart of a second mode in the embodiment shown in FIG. 4.

In the embodiment of the present disclosure, steps 403, 404, 405, 407, 409, 410, and 411 show the display manner of the second mode. In an exemplary embodiment, FIG. 6 is a schematic diagram of the display in the second mode according to an embodiment of the present disclosure. The physical resolution of the display screen 122 is 2160×2160. The processing component 11 splits an image to be displayed of a resolution of 2160×2160 into four images of a resolution of 540×2160 (A1, A2, A3 and A4) and transmits these 4 images to the display component 12 at the third frequency. Upon receiving the 4 images of a resolution of 540×2160, the image processing IC in the display component 12 may combine and restore these 4 images of a resolution of 540×2160 into an image of a resolution of 2160×2160 to be displayed on the display screen 122, thus realizing a high-resolution display mode.

In a relatively static scene, the human eye is more sensitive to the resolution of the image, but less sensitive to the frame rate of the image display, so the image can be displayed with a higher resolution and a lower frame rate to improve user experience.

In summary, according to the image display method provided by the embodiment of the present disclosure, two types of display modes are provided. In one mode, a first image composed of a plurality of sub-images can be transmitted to a display component, such that the display component displays these sub-images at a higher frequency. In another mode, a frame of an image can be transmitted to the display component a plurality of times, such that the display component displays images of a higher resolution at a lower frequency. The display methods are more abundant, and the flexibility is high, which solves the problem of low flexibility in the methods in the related technology, and achieves the effect of improving the flexibility of the method.

Figure 7:
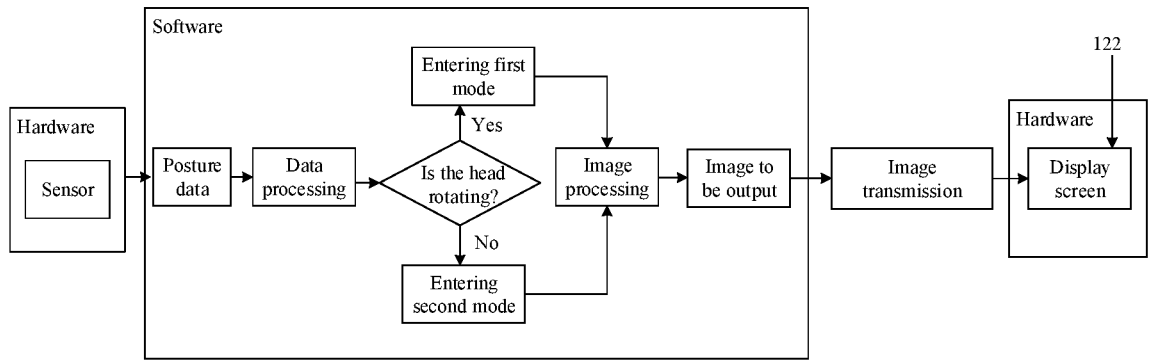
FIG. 7 is a schematic flowchart of a system in the embodiment shown in FIG. 4.

In the embodiment of the present disclosure, the display mode is determined by whether the human head rotates quickly. The system flowchart of this method may be as shown in FIG. 7. A sensor of a hardware part may acquire posture information of a user's head. After the posture information is transmitted to the software part, a software part may determine whether the head is rotating rapidly or not based on the posture information through data processing. When the head rotates rapidly, it enters the first mode. When the head does not rotate rapidly, it enters the second mode, image processing is performed (the image processing process may be made reference to the above embodiment, and is not repeated here) to acquire an image to be output, and the image to be output is output to a display screen of the hardware part for display.

By means of this display method, if an angular velocity of the user's head on a certain axis (such as an x-axis vertical to the ground) gradually increases (the head is in a state of starting to rotate) and is greater than a threshold, it may enter the first mode for display. When the angular velocity of the user's head is greater than the threshold and continues to increase to a certain angular velocity and keep remained (the head is in a state of rotating in this case), the first mode may be maintained for display. When the angular velocity of the user's head decreases and is lower than the threshold (the head is in a state of stopping rotation in this case), it can be switched to the second mode for display.

FIG. 1 is a block diagram of a display device according to an embodiment of the present disclosure. The display device 10 includes a processing component 11 and a display component 12.

The processing component 11 is configured to acquire mode information.

The processing component 11 is configured to transmit a first image of a first resolution to the display component at a first frequency in the case that the mode information indicates a first mode, wherein the first image is formed by splicing a plurality of sub-images of a second resolution.

The display component 12 is configured to display the plurality of sub-images in the first image at a second frequency, wherein the second frequency is greater than the first frequency.

The processing component 11 is configured to transmit a second image of the first resolution to the display component at a third frequency in the case that the mode information indicates a second mode.

The display component 12 is configured to, upon receiving n second images, splice the n second images into a frame of image for display, where n 2.

In summary, according to the image display device provided by the embodiment of the present disclosure, two types of display modes are provided. In one mode, a first image composed of a plurality of sub-images can be transmitted to a display component, such that the display component displays these sub-images at a higher frequency. In another mode, a frame of an image can be transmitted to the display component a plurality of times, such that the display component displays images of a higher resolution at a lower frequency. The display methods are more abundant, and the flexibility is high, which solves the problem of low flexibility in the methods in the related technology, and achieves the effect of improving the flexibility of the method.

Figure 8:
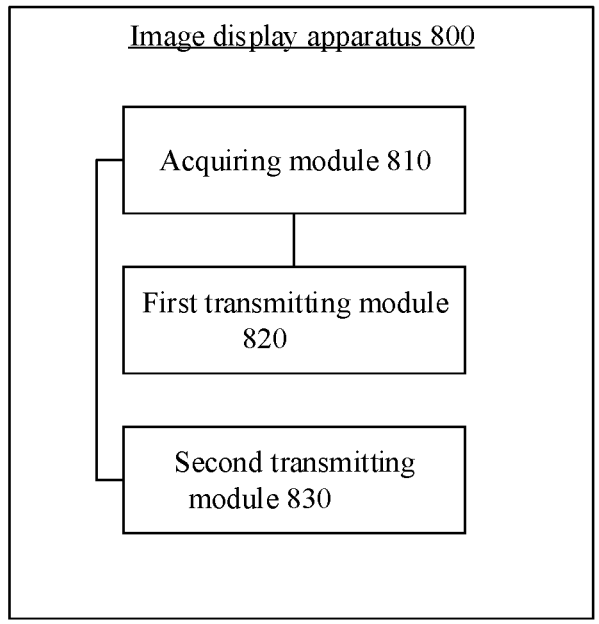
FIG. 8 is a block diagram of an image display apparatus according to an embodiment of the present disclosure.

FIG. 8 is a structural block diagram of an image display apparatus according to an embodiment of the present disclosure. The image display apparatus may be integrated into the processing component of the implementation environment shown in FIG. 1 through hardware or software. The image display apparatus 800 includes the following modules.

An acquiring module 810 is configured to acquire mode information.

A first transmitting module 820 is configured to transmit a first image of a first resolution to a display component at a first frequency in the case that the mode information indicates a first mode, wherein the first image is formed by splicing a plurality of sub-images of a second resolution.

A second transmitting module 830 is configured to transmit a second image of the first resolution to the display component at a third frequency in the case that the mode information indicates a second mode, wherein n second images form a frame of image of the display component, and n≥2.

In summary, according to the image display apparatus provided by the embodiment of the present disclosure, two types of display modes are provided. In one mode, a first image composed of a plurality of sub-images can be transmitted to a display component, such that the display component displays these sub-images at a higher frequency. In another mode, a frame of an image can be transmitted to the display component a plurality of times, such that the display component displays images of a higher resolution at a lower frequency. The display methods are more abundant, and the flexibility is high, which solves the problem of low flexibility in the methods in the related technology, and achieves the effect of improving the flexibility of the method.

Optionally, the first transmitting module is configured to:
acquire the plurality of sub-images of the second resolution in the case that the mode information indicates the first mode; and
splice the plurality of sub-images into the first image of the first resolution.

Optionally, the second transmitting module is configured to:
acquire a third image of a third resolution in the case that the mode information indicates the second mode;
crop the third image into the n second images of the first resolution; and
transmit the second image of the first resolution to the display component at the third frequency.

Optionally, the first frequency is equal to the third frequency.

Optionally, the first transmitting module is configured to:
generate the first image of the first resolution with a first mode identifier; and
transmit the first image of the first resolution with the first mode identifier to the display component.

Optionally, the first mode identifier is disposed at a corner of the first image.

Optionally, the second transmitting module is configured to:
generate the second image of the first resolution with a second mode identifier; and
transmit the second image of the first resolution with the second mode identifier to the display component.

Optionally, the second mode identifier is disposed at a corner of the second image.

Optionally, the image display apparatus is applicable to the processing component in a virtual reality device, and the acquiring module is configured to:
acquire posture information of a user's head;
determine a rotation speed of the head based on the posture information;
determine that the mode information indicates the first mode in response to the rotation speed being greater than a threshold; and
determine that the mode information indicates the second mode in response to the rotation speed being less than or equal to the threshold.

Figure 9:
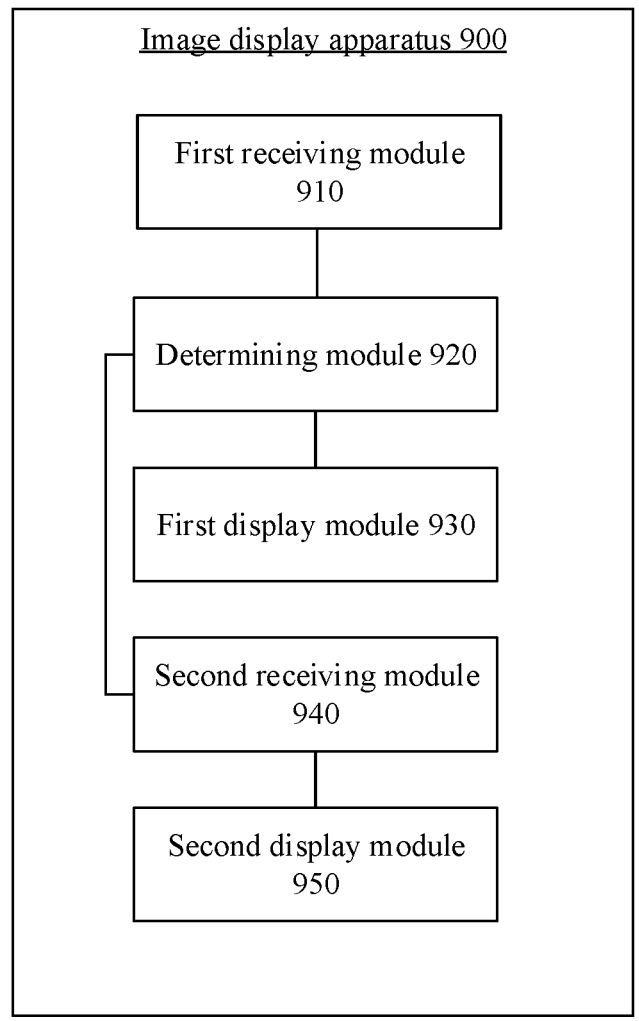
FIG. 9 is a block diagram of an image display apparatus according to another embodiment of the present disclosure.

FIG. 9 is a structural block diagram of an image display apparatus according to an embodiment of the present disclosure. The image display apparatus may be integrated into the display component of the implementation environment shown in FIG. 1 through hardware or software. The image display apparatus 900 includes the following modules.

A first receiving module 910 is configured to receive an image of a first resolution.

A determining module 920 is configured to acquire a mode identifier, wherein the mode identifier is configured to indicate that the image is in a first mode or a second mode.

A first display module 930 is configured to, in the case that the image is in the first mode, split the image as a first image into a plurality of sub-images of a second resolution, and displaying the plurality of sub-images of the second resolution at a second frequency.

A second receiving module 940 is configured to, in the cast that the image is in the second mode, receive n−1 images of the first resolution in the second mode, and n≥2.

A second display module 950 is configured to splice the received n images of the first resolution into a frame of image for display.

In summary, according to the image display apparatus provided by the embodiment of the present disclosure, two types of display modes are provided. In one mode, a first image composed of a plurality of sub-images cany be transmitted to a display component, such that the display component displays these sub-images at a higher frequency. In another mode, a frame of image can be transmitted to the display component a plurality of times, such that the display component displays images of a higher resolution at a lower frequency. The display methods are more abundant, and the flexibility is high, which solves the problem of low flexibility in the methods in the related technology, and achieves the effect of improving the flexibility of the method.

Optionally, the image display apparatus further includes:
an identifier acquiring module, configured to acquire the mode identifier in the image;
a first determining module, configured to determine that the image is in the first mode if the mode identifier is a first mode identifier; and
a second determining module, configured to determine that the image is in the second mode if the mode identifier is a second mode identifier.

Optionally, the image display apparatus further includes:
a third display module, configured to display a third image of a third resolution at a fourth frequency, wherein the third image is composed of the n second images, the fourth frequency being lower than the second frequency, and the third resolution being greater than the first resolution.

According to another aspect of the present disclosure, an image display device is also provided. The image display device includes a processor and a memory storing at least one instruction, at least a program, a code set or an instruction set therein, wherein the processor, when loading and executed the at least one instruction, the at least one program, the code set or the instruction set, is caused to perform the image display method as described above.

According to another aspect of the present disclosure, a non-transitory computer storage medium is provided. The non-transitory computer storage medium stores at least one instruction, at least one program, a code set or an instruction set, wherein the at least one instruction, the at least one program, the code set or the instruction set, when loaded and executed by a processor, causes the processor to perform the image display method as described above.

According to another aspect of the present disclosure, a computer program product or computer program is provided. The computer program product or computer program includes computer instructions, and the computer instructions are stored in a computer-readable storage medium. A processor of A computer device reads the computer instructions from the computer-readable storage medium, and executes the computer instructions, such that the computer device performs the methods according to various optional implementations described above.

In the present disclosure, the terms "first", "second", "third" and "fourth" are merely used for descriptive purposes, and cannot be understood as indicating or implying relative importance. The term "a plurality of" refers to two or more, unless specifically defined otherwise.

In the embodiments according to the present disclosure, it should be understood that the disclosed apparatus and method may be implemented in other ways. For example, the apparatus embodiments described above are merely illustrative. For example, the division of the units is merely a logical function division, and there may be other divisions in actual implementation. For example, a plurality of units or components may be combined or integrated into another system, or some features may be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be disposed in one place, or they may be distributed to a plurality of network units. Some or all of the units may be selected according to actual needs to achieve the objectives of the solutions of the embodiments.

Those of ordinary skill in the art can understand that all or part of the steps in the above embodiments may be implemented by hardware, or by a program to instruct related hardware. The program may be stored in a computer-readable storage medium. The above storage medium may be a read-only memory, a magnetic disk or an optical disk and the like.

Described above are merely optional embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. An image display method, applicable to a processing component, the method comprising:
   acquiring mode information;
   transmitting a first image of a first resolution to a display component at a first frequency in the case that the mode information indicates a first mode, wherein the first image is formed by splicing a plurality of sub-images of a second resolution; and
   transmitting a second image of the first resolution to the display component at a third frequency in the case that the mode information indicates a second mode, wherein n second images form a frame of image of the display component, and n≥2.

2. The method according to claim 1, wherein transmitting the first image of the first resolution to the display component at the first frequency in the case that the mode information indicates the first mode comprises:
   acquiring the plurality of sub-images of the second resolution in the case that the mode information indicates the first mode; and
   splicing the plurality of sub-images into the first image of the first resolution.

3. The method according to claim 1, wherein transmitting the second image of the first resolution to the display component at the third frequency in the case that the mode information indicates the second mode comprises:
   acquiring a third image of a third resolution in the case that the mode information indicates the second mode;
   cropping the third image into the n second images of the first resolution; and
   transmitting the second image of the first resolution to the display component at the third frequency.

4. The method according to claim 1, wherein transmitting the first image of the first resolution to the display component at the first frequency comprises:
   generating the first image of the first resolution with a first mode identifier; and
   transmitting the first image of the first resolution with the first mode identifier to the display component.

5. The method according to claim 1, wherein transmitting the second image of the first resolution to the display component at the third frequency comprises:
   generating the second image of the first resolution with a second mode identifier; and
   transmitting the second image of the first resolution with the second mode identifier to the display component.

6. The method according to claim 1, wherein the method is applicable to the processing component in a virtual reality device, and acquiring the mode information comprises:
   acquiring posture information of a user's head;
   determining a rotation speed of the head based on the posture information;
   determining that the mode information indicates the first mode in response to the rotation speed being greater than a threshold; and
   determining that the mode information indicates the second mode in response to the rotation speed being less than or equal to the threshold.

7. An image display method, applicable to a display component, the method comprising:
   receiving an image of a first resolution;
   acquiring a mode identifier, wherein the mode identifier is configured to indicate that the image is in a first mode or a second mode;
   in the case that the image is in the first mode, splitting the image as a first image into a plurality of sub-images of a second resolution, and displaying the plurality of sub-images of the second resolution at a second frequency;
   in the cast that the image is in the second mode, receiving n−1 images of the first resolution, and n≥2, and
   splicing the received n images of the first resolution into a frame of an image for display.

8. The method according to claim 7, wherein acquiring the mode identifier comprises:
   acquiring the mode identifier in the image.

9. The method according to claim 7, wherein in the case that the image is in the first mode, splitting the image as the first image into the plurality of sub-images of the second resolution, and displaying the plurality of sub-images of the second resolution at the second frequency comprises:
   cropping the image of the first resolution into the plurality of sub-images of the second resolution in the case that the image is in the first mode; and
   scaling up the sub-images of the second resolution into an image of a third resolution and displaying the image of the third resolution at the second frequency.

10. The method according to claim 7, wherein the image of the first resolution is regarded as an second image, and splicing the received n images of the first resolution into the frame of the image for display comprises:

displaying a third image of a third resolution at a fourth frequency, wherein the third image is composed of the n second images, the fourth frequency being lower than the second frequency, and the third resolution being greater than the first resolution.

11. An image display device, comprising a processor and a memory storing at least one instruction, at least one program, a code set or an instruction set therein, wherein the processor, when loading and executing the at least one instruction, the at least one program, the code set or the instruction set, is caused to perform the image display method as defined in claim 7.

12. A non-transitory computer storage medium storing at least one program, a code set, or an instruction set therein, wherein the at least one instruction, the at least one program, the code set or the instruction set, when loaded and executed by a processor, causes the processor to perform the image display method as defined in claim 1.

13. A non-transitory computer storage medium storing at least one program, a code set, or an instruction set therein, wherein the at least one instruction, the at least one program, the code set or the instruction set, when loaded and executed by a processor, causes the processor to perform the image display method as defined in claim 7.

14. An image display device, comprising a processor and a memory storing at least one instruction, at least one program, a code set or an instruction set therein, wherein the processor, when loading and executing the at least one instruction, the at least one program, the code set or the instruction set, is caused to perform:

acquiring mode information;

transmitting a first image of a first resolution to a display component at a first frequency in the case that the mode information indicates a first mode, wherein the first image is formed by splicing a plurality of sub-images of a second resolution; and transmitting a second image of the first resolution to the display component at a third frequency in the case that the mode information indicates a second mode, wherein n second images form a frame of image of the display component, and n≥2.

15. The device according to claim 14, wherein the processor, when loading and executing the at least one instruction, the at least one program, the code set or the instruction set, is further caused to perform:

acquiring the plurality of sub-images of the second resolution in the case that the mode information indicates the first mode; and splicing the plurality of sub-images into the first image of the first resolution.

16. The device according to claim 14, wherein the processor, when loading and executing the at least one instruction, the at least one program, the code set or the instruction set, is further caused to perform:

acquiring a third image of a third resolution in the case that the mode information indicates the second mode;

cropping the third image into the n second images of the first resolution; and transmitting the second image of the first resolution to the display component at the third frequency.

17. The device according to claim 14, wherein the processor, when loading and executing the at least one instruction, the at least one program, the code set or the instruction set, is further caused to perform:

generating the first image of the first resolution with a first mode identifier; and transmitting the first image of the first resolution with the first mode identifier to the display component.

18. The device according to claim 14, wherein the processor, when loading and executing the at least one instruction, the at least one program, the code set or the instruction set, is further caused to perform:

generating the second image of the first resolution with a second mode identifier; and transmitting the second image of the first resolution with the second mode identifier to the display component.

19. The device according to claim 14, wherein the processor, when loading and executing the at least one instruction, the at least one program, the code set or the instruction set, is further caused to perform:

acquiring posture information of a user's head;

determining a rotation speed of the head based on the posture information;

determining that the mode information indicates the first mode in response to the rotation speed being greater than a threshold; and determining that the mode information indicates the second mode in response to the rotation speed being less than or equal to the threshold.

\* \* \* \* \*